United States Patent
Morandin (10) Patent No.: US 7,643,430 B2
(45) Date of Patent: Jan. 5, 2010

(54) METHODS AND APPARATUS FOR DETERMINING REVERSE PATH DELAY

(75) Inventor: Guglielmo M. Morandin, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 611 days.

(21) Appl. No.: 11/291,251

(22) Filed: Nov. 30, 2005

(65) Prior Publication Data

US 2007/0121523 A1 May 31, 2007

(51) Int. Cl.
*G01R 31/08* (2006.01)
*H04J 3/06* (2006.01)

(52) U.S. Cl. .......................... 370/252; 370/503; 370/516

(58) Field of Classification Search .............. 370/241.1, 370/252–255, 503, 229–235, 504, 516, 519; 709/232–235
See application file for complete search history.

(56) References Cited

U.S. PATENT DOCUMENTS

| | | | | |
|---|---|---|---|---|
| 5,708,502 | A * | 1/1998 | Denton et al. ............... | 356/312 |
| 6,094,562 | A * | 7/2000 | Zhong ..................... | 455/67.16 |
| 6,252,851 | B1 * | 6/2001 | Siu et al. .................... | 370/236 |
| 6,510,150 | B1 * | 1/2003 | Ngo .......................... | 370/347 |
| 6,563,796 | B1 * | 5/2003 | Saito ......................... | 370/252 |
| 6,680,921 | B1 * | 1/2004 | Svanbro et al. ............ | 370/324 |
| 7,024,257 | B2 * | 4/2006 | Pearce et al. ................. | 700/72 |
| 7,069,034 | B1 * | 6/2006 | Sourour ...................... | 455/522 |
| 7,133,368 | B2 * | 11/2006 | Zhang et al. ................ | 370/249 |
| 7,283,474 | B1 * | 10/2007 | Bergenwall ................. | 370/235 |
| 7,289,454 | B2 * | 10/2007 | Bovo et al. .................. | 370/252 |
| 7,352,700 | B2 * | 4/2008 | Chan et al. .................. | 370/235 |
| 7,417,993 | B1 * | 8/2008 | Ebergen et al. ........ | 370/395.72 |
| 2003/0137972 | A1 * | 7/2003 | Kowalewski ............... | 370/351 |
| 2004/0184323 | A1 * | 9/2004 | Mori et al. ............. | 365/189.12 |
| 2005/0216599 | A1 * | 9/2005 | Anderson et al. ........... | 709/232 |
| 2006/0179338 | A1 * | 8/2006 | Sumner ...................... | 713/375 |
| 2007/0041335 | A1 * | 2/2007 | Znamova et al. ............ | 370/254 |

OTHER PUBLICATIONS

Wang Q, Long K, Cheng S, Zhang R; "TCP-Friendly Congestion Control Schemes in the Internet", National Key Lab of Switching Technology and Telecommunication Networks, Beijing Univ. of Posts & Telecommunincations; p. 211-216; published 2001, retrieved on Sep. 12, 2008 on http://www.sics.se/~runtong/11.pdf.*
Cheng Jin, David X. Wei, and Steven H. Low, "Fast TCP: Motivation, Architecture, Algorithms, Performance" Aug. 2, 2004, 44 pages.

* cited by examiner

*Primary Examiner*—Seema S. Rao
*Assistant Examiner*—Xavier Szewai Wong
(74) *Attorney, Agent, or Firm*—Weaver Austin Villeneuve & Sampson LLP (57) ABSTRACT

According to the present invention, methods and apparatus are provided for determining components of a round trip time (RTT). A source node sends data to a destination node. The destination node inserts a timestamp into an acknowledgment and sends the acknowledgment back to the source node. The source node determines the RTT from its own measurements and estimates reverse path delay by comparing timestamps to expected timestamps. Considerations for destination node timestamp speed differences are provided.

25 Claims, 7 Drawing Sheets

METHODS AND APPARATUS FOR DETERMINING REVERSE PATH DELAY

CROSS REFERENCE TO RELATED CASES

The present application is related to concurrently filed U.S. Patent Application No. 60/75220, titled TRANSMISSION CONTROL PROTOCOL (TCP) CONGESTION CONTROL by Guglielmo M. Morandin, the entirety of which is incorporated by reference for all purposes.

BACKGROUND OF THE INVENTION

1. Field of the Invention.

The present invention generally relates to networking. More specifically, the present invention provides techniques and mechanisms for determining reverse path delay associated with a round trip time measurement.

2. Description of Related Art

Round trip time (RTT) is a commonly used networking metric for determining congestion between a source and a destination in a variety of networks. Networking tools and utilities allow a source to send data to a destination and the destination to respond to the source. The measured time between transmission of the data and receipt of the acknowledgment is referred to as the RTT. The RTT can be used by the source to estimate network congestion and latency between a source and a destination.

The RTT can also be used to set transmission rates and window sizes at a source. For example, if the RTT is relatively small, a source may interpret it as an indication of reduced network congestion and elect a higher transmission rate and a larger window size. Some improvements to TCP such as FastTCP described in "FastTCP: Motivation, Architecture, Algorithms, Performance" by Chen Jin, David Wei, and Steven Low, IEEE Infocom, March 2004, Hong Kong, explicitly use RTT to optimize window sizes.

However, using RTT as a metric for determining congestion has significant limitations. Consequently, it is desirable to provide techniques for improving the measurement of RTT components, such as reverse path delay or reverse delay components associated with RTT.

SUMMARY OF THE INVENTION

According to the present invention, methods and apparatus are provided for determining components of a round trip time (RTT). A source node sends data to a destination node. The destination node inserts a timestamp into an acknowledgment and sends the acknowledgment back to the source node. The source node determines the RTT from its own measurements and estimates reverse path delay by comparing timestamps to expected timestamps. Considerations for node timestamp speed differences are provided.

In one embodiment, a technique for determining reverse path delay associated with data transmission between a source and a destination is provided. Multiple packets are sent from a source to a destination. Multiple acknowledgments are received from the destination. Multiple acknowledgments include multiple timestamps provided by the destination. Multiple expected timestamps and a timestamp speed associated with the destination are identified. The multiple expected timestamps are compared to the multiple timestamps provided by the destination and the timestamp speed associated with the destination to determine reverse path delay.

In another embodiment, a system for determining reverse path delay associated with data transmission between the system and a destination is provided. The system includes an interface and a processor. The interface is configured to send multiple packets from a source to a destination and receive multiple acknowledgments from the destination. The multiple acknowledgments include multiple timestamps provided by the destination. The processor is configured to identify multiple expected timestamps and a timestamp speed associated with the destination and compare the multiple expected timestamps to the multiple timestamps provided by the destination and the timestamp speed associated with the destination to determine reverse path delay.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of the transmission control protocol (TCP) stack implemented in an intelligent fibre channel switch. However, it should be noted that the techniques of the present invention can be applied to different variations and flavors of TCP as well as to alternatives to TCP. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention.

Round trip time (RTT) is a metric used by a source to determine a variety of network characteristics, including congestion, latency, etc. Tools and utilities such as ping and traceroute measure the time required for a source to receive an acknowledgment from a destination after sending data to the destination. In some examples, an increase in RTT is an indication that one or more links on the path between a source and a destination is congested.

It is relatively straightforward to obtain RTT estimates with precision limited only by the local clock at a source. For example, most processors provide a register that is automatically incremented every clock cycle. Processor and hardware based clocks can be used as very high resolution local clocks. Transmission of data and receipt of a corresponding acknowledgment from a destination are measured using clock cycles. All measurements can be performed in terms of clock cycles, and converted to a conventional time unit only when strictly necessary.

Software based clocks can also be used, although software based clocks do not necessarily have the same precision. Timestamp schemes can be used in conjunction with hardware and software based clocks, although timestamps in the actual packets sent are not required. A source can simply send a packet, record the current time, and calculate the elapsed time once an acknowledgment for the packet is received. Any corresponding response packet is referred to herein as an acknowledgment. A source can obtain RTT measurements frequently and with a considerable degree of accuracy.

However, the techniques of the present invention recognize that measurements such as RTT are not necessarily ideal for determining network characteristics such as congestion. For example, RTT does not isolate delay due to congestion on the forward path from a source to a destination from other causes of delay. The techniques of the present invention recognize that round trip times are sensitive to congestion happening in the forward direction from a source to a destination as well as congestion happening in the reverse direction from the destination back to the source. It is recognized that it would be beneficial to determine forward and reverse components of RTT. In one example, it is preferable to consider only forward direction congestion, since forward direction congestion or forward queuing is what should affect window sizes and transmission rates from a source. Conventional TCP and Fast-TCP both are sensitive to reverse direction congestion. Reverse direction congestion or reverse queuing should only affect window sizes and transmission rates for data being sent from the connection peer.

Having accurate measurements of forward component delay and reverse component delay would allow more effective control and optimization of network transmissions. For example, a maximum window size as well as a congestion window size are calculated using values associated with forward direction queuing and delay. Forward delay is referred to herein as a value determined by subtracting the reverse delay from the total delay. In some embodiments, forward delay is determined by subtracting the reverse delay and the inherent delay from the total delay.

Figure 1:
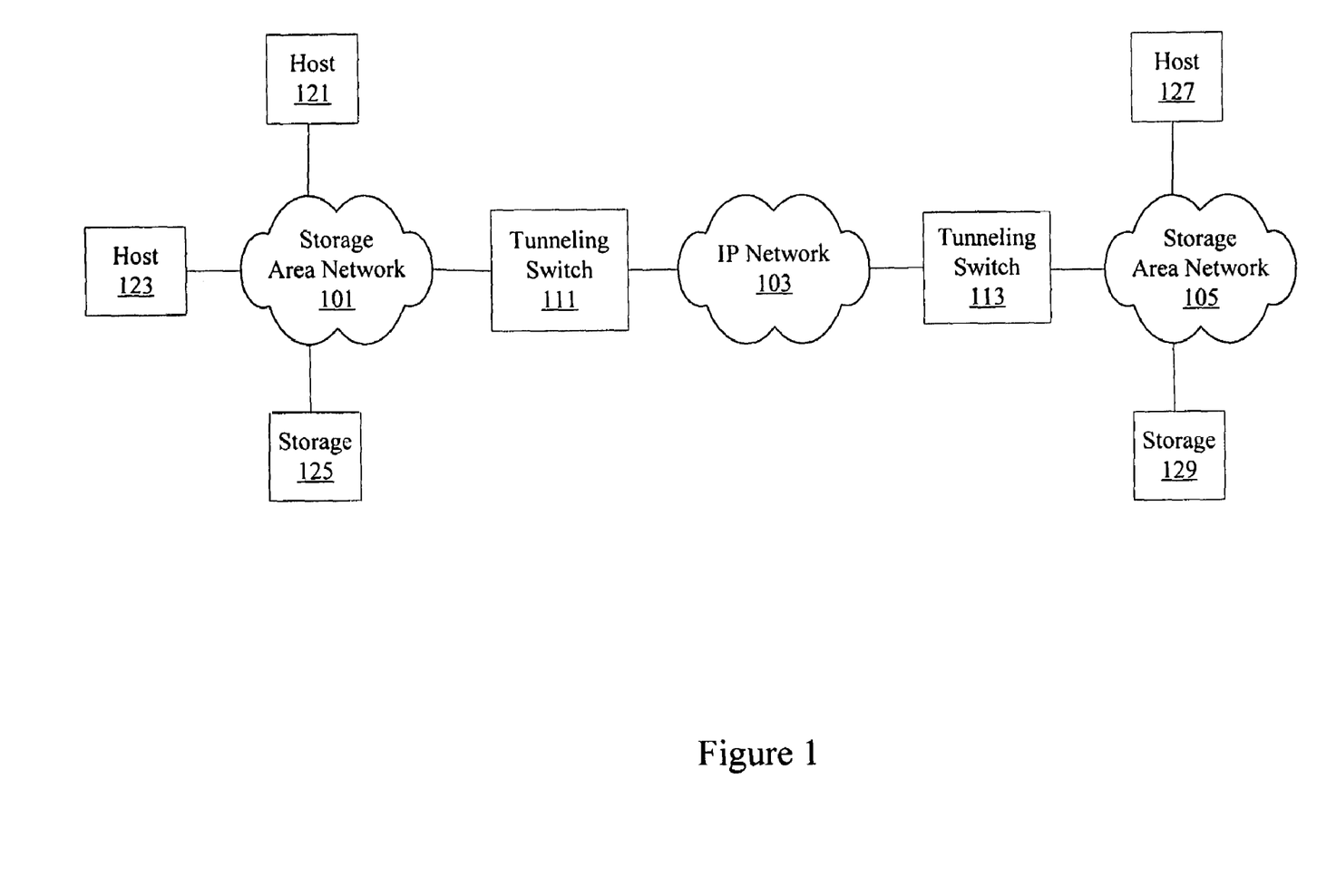
FIG. 1 is a diagrammatic representation showing network nodes that can use the techniques of the present invention.

FIG. 1 is a diagrammatic representation showing a network topology that can use the techniques of the present invention. Although one particular network topology is shown, it should be recognized that the techniques of the present invention can be applied to a variety of IP and non-IP networks and network configurations including TCP improvements. In some examples, fibre channel protocols such as Remote Domain Loopback can use some of the techniques of the present invention. According to various embodiments, a storage area network 101 includes hosts 121 and 123 along with storage node 125. Storage node 125 may include a disk or tape array. The storage area network 101 can also include multiple fibre channel switches. The storage area network 101 is coupled to an IP network 103 through a tunneling switch 111. Storage area network 105 includes host 127, storage 129, as well as other fibre channel switches and tunneling switch 113. The tunneling switches 111 and 113 allow the formation of a tunnel to transmit storage network data over an IP network 103.

According to various embodiments, a tunneling switch 111 as well as other nodes have forward buffers for holding data for transmission from storage area network 101 to storage area network 105. In some examples, the forward buffers may be full, causing delay at tunneling switch 111 for data transmitted from storage area network 101 to storage area network 105. In other examples, reverse buffers may be full, causing delay at tunneling switch 111 for data transmitted from storage area network 105 to storage area network 101. Round trip time is a rough metric that can estimate the amount of congestion in general. However, round trip time can not distinguish between congestion caused at least in part by forward delay and congestion cause by reverse delay. In some instances, only reverse delay may be present, and it would not make sense to slow transmission from a source. However, protocols such as FastTCP use round trip time as a congestion metric and would slow transmission from a source even when the only delay present is reverse delay.

Figure 2:
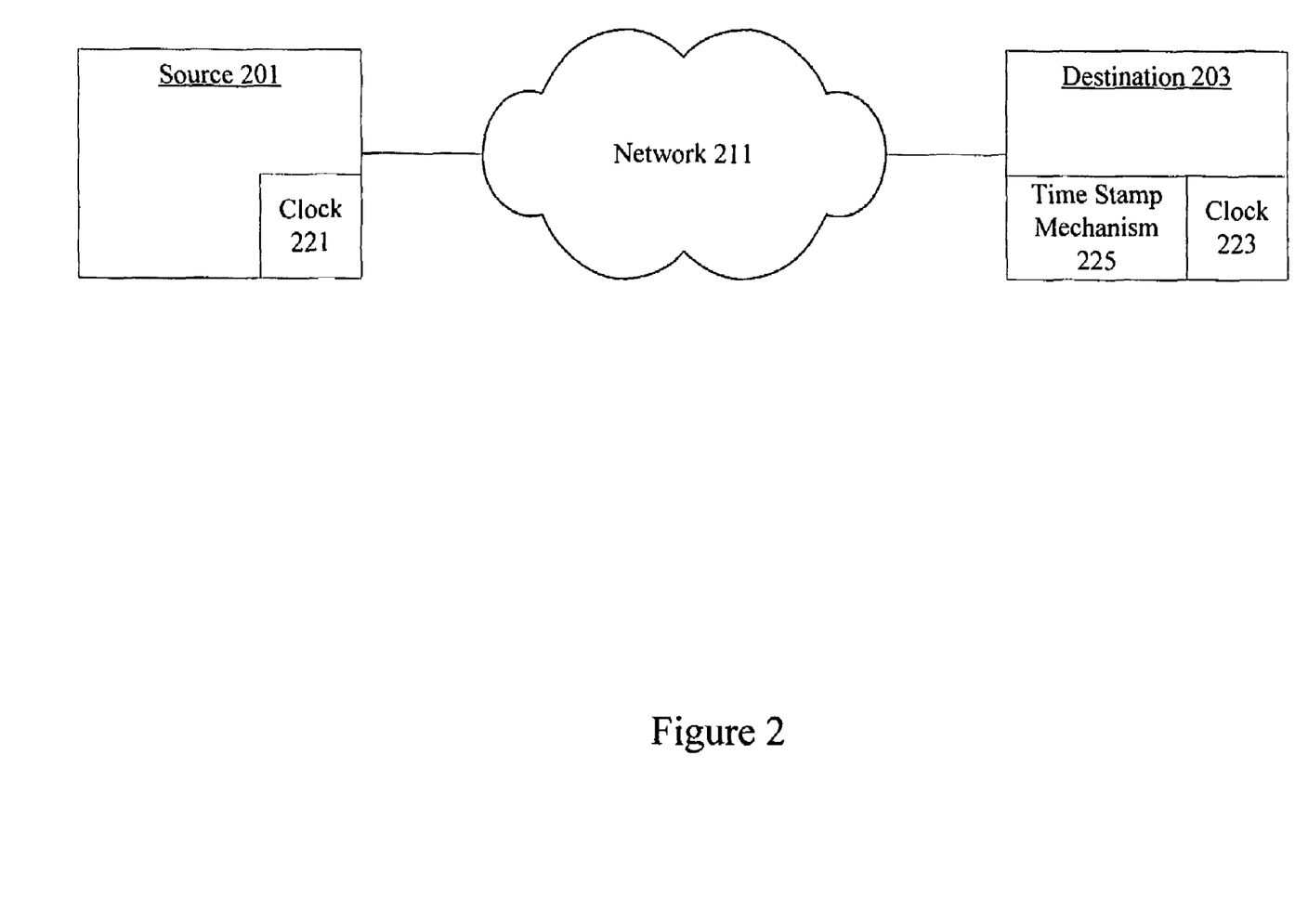
FIG. 2 is a diagrammatic representation showing a source and a destination.

FIG. 2 is a diagrammatic representation showing one example of a source node and a destination node. According to various embodiments, a source node 201 is connected to a destination node 203 over a network 211. The network 211 may include multiple switches, routers, subnetworks, etc. The source node 201 includes a clock 221. The destination node 203 includes a clock 223 and a timestamp mechanism 225. The source node 201 may also include a timestamp mechanism. In one embodiment, both the source node and the destination node insert timestamps into their generated packets, even though the source node may not use its own timestamps to perform precise round trip time measurements.

According to various embodiments, a source node 201 tracks the time of transmission of a packet. The destination node 203 receives the packet, inserts a timestamp, and sends the acknowledgment. The source node 201 then uses the difference between send time and acknowledgment reception time to determine a round trip time and also has the acknowledge timestamp to make additional determinations. If it were possible to globally synchronize and maintain precise global synchronization of clocks 221 and 223, very simple processing would be required to determine forward and reverse delays. However, precisely and accurately synchronization of clocks residing in disparate nodes is difficult, and even though not impossible, at least in principle, it certainly requires collaboration and intention to do so by the two entities involved. In many conventional network implementations, it is only possible to periodically roughly synchronize clocks of distant nodes. The clocks of disparate nodes then can begin to get out of synchronization. Clock drift prevents consistently and accurately synchronized disparate clocks.

According to various embodiments, the techniques of the present invention recognize that global synchronization is difficult and consequently no global timestamp synchronization is required. In fact, it is not required for the destination node 203 to perform any extra processing beyond its normal functions and timestamp insertion. According to various embodiments, only the source node 201 receiving timestamp information from destination node 203 is required to estimate queuing delay in both directions. The destination node 203 can only measure the round trip time for retransmission timer setup purposes, and may or may not take advantage of timestamp information from the source node 201. Of course it is perfectly valid that both nodes operate in a symmetric way, both estimating reverse and forward congestion, without any need to classify the peer as a normal TCP or a TCP with capabilities similar to its own.

The timestamps are normally assigned by the destination node 203 as a result of an interrupt triggered by a real time clock. For this reason, the timestamp value used by the destination node 203 changes at points in time that deviate from the precise actual time for several reasons, including variable interrupt latency and drift of the real time clock. The variation in interrupt latency at a network node is difficult to estimate, but it is likely to be much smaller than the timestamp tick. In the case of Remote Domain Loopback, the timestamp is implemented completely in hardware, so the interrupt latency is nearly nonexistent. Only the drift of the real time clock becomes a factor.

The real time clock can be commonly expected to drift less than 50 parts per million. The destination node 203 sends packets to the source node 201 at arbitrary instances in time, but uses the current timestamp that has been updated by hardware or a software interrupt routine. It is not assumed that the timestamp tick is the same between node 201 and node 203 (in fact S does not use its own timestamps to perform the reverse delay estimation). It is recognized that almost all TCP implementations use a tick of 10 ms or, less likely, 1 ms.

To determine components of round trip time, the source node 201 initially observes timestamps in packets arriving from the destination node in order to estimate the speed at which node D updates its timestamp. The speed can be determined using the following equation:

$$ts\_speed \leftarrow \frac{ts\_val - ts_0}{t - t_0} \quad \text{(Equation 1)}$$

where ts_val is a timestamp received at time t; and
$ts_0$ is a timestamp received at time $t_0$.

By observing the remote end for a sufficiently long period of time, any desired precision can be achieved. However, to be able to perform the delay estimation after a reasonably short time (on the order of seconds) a more pragmatic method can be used. According to various embodiments, it is sufficient to observe the remote timestamp for a few seconds to be able to disambiguate timestamp speed possibilities, such as the 1 ms and 10 ms cases. If the estimated timestamp speed is reasonably close to one of the expected speeds, the algorithm is activated. Otherwise, it is disabled. Of course, in some instances, the problem is trivial because it is appreciated that all the network nodes employ the same timestamp tick.

All the following mathematical formulas are expressed for clarity using conventional arithmetic, however it should be noted that timestamps, like sequence numbers, are integer numbers of finite size. TCP, for example, employs 32 bit timestamps. For this reason those skilled in the art will appreciate that operation and comparisons can be performed using modular arithmetic.

Once the remote timestamp speed is known, it is possible to estimate the timestamp of an incoming packet using the following formula:

$$ts\_est \leftarrow ts_0 + ts\_speed(t - t_0) \quad \text{(Equation 2)}$$

where ts_est is the predicted timestamp;
$ts_0$ is a timestamp received at time to; and
t is the current time.

The incoming timestamp (ts_val) is compared to the integer part of the predicted timestamp. The predicted timestamp could be before, after or the same as the incoming timestamp. According to various embodiments, if the integer part of ts_est and ts_val are the same no evidence of reverse delay is present, since the remote end is expected to use the same timestamp value for the duration of one tick.

Figure 3:
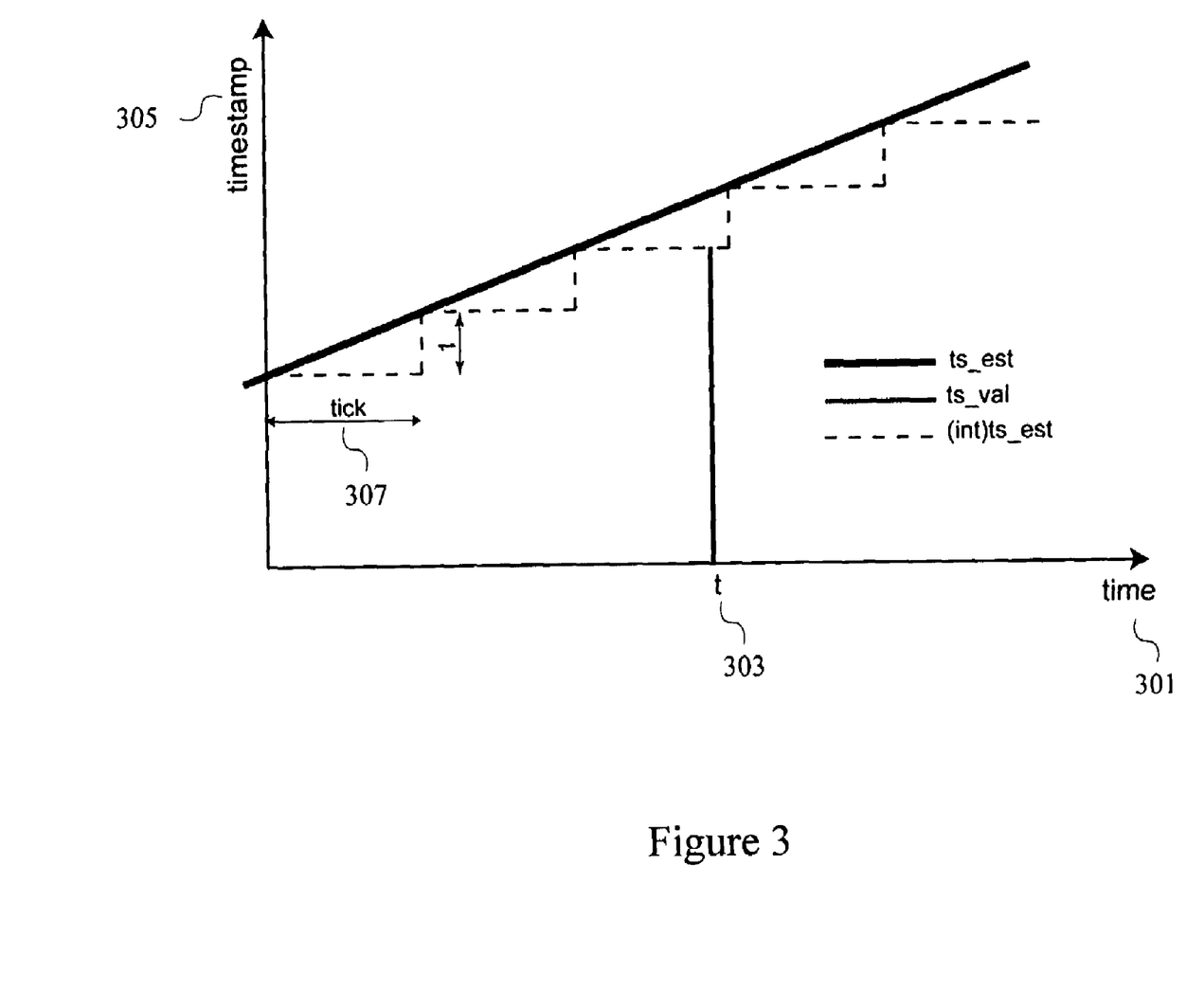
FIG. 3 is a graphical representation showing a no delay condition.

FIG. 3 is a diagrammatic representation showing timestamp estimates graphed with timestamp values showing no delay. The x-axis shows time 301 while the y-axis shows timestamps 305. After a period of one tick 307, it is expected that a timestamp will be received from the destination node. Timestamps may arrive readily and steadily at periodic intervals. The exact send time of each packet containing a timestamp is determined by the peer and is in general not predictable. However the value of the timestamp put in each packet is predictable. One particular time stamp arrives at time 303. In this example, the timestamp expected is the timestamp value after two ticks. The timestamp value received is the timestamp value after two ticks. No delay is evident. However, if the timestamp value is not received until later due to reverse delay, the expected timestamp at that point would be the timestamp value after say three or four ticks. If the received timestamp value is still only the timestamp value after two ticks, delay is evident. That is, the ts_val is smaller than the ts_est. If the incoming timestamp is smaller than the predicted timestamp, it is interpreted as evidence of reverse delay. The reverse delay sample can be calculated by using the following formula:

$$\Delta t \leftarrow \frac{ts\_est - ts\_val - 1}{ts\_speed} \quad \text{(Equation 3)}$$

where ts_est is the predicted timestamp;
ts_val is the timestamp value; and
ts_speed is the timestamp speed.

Figure 4:
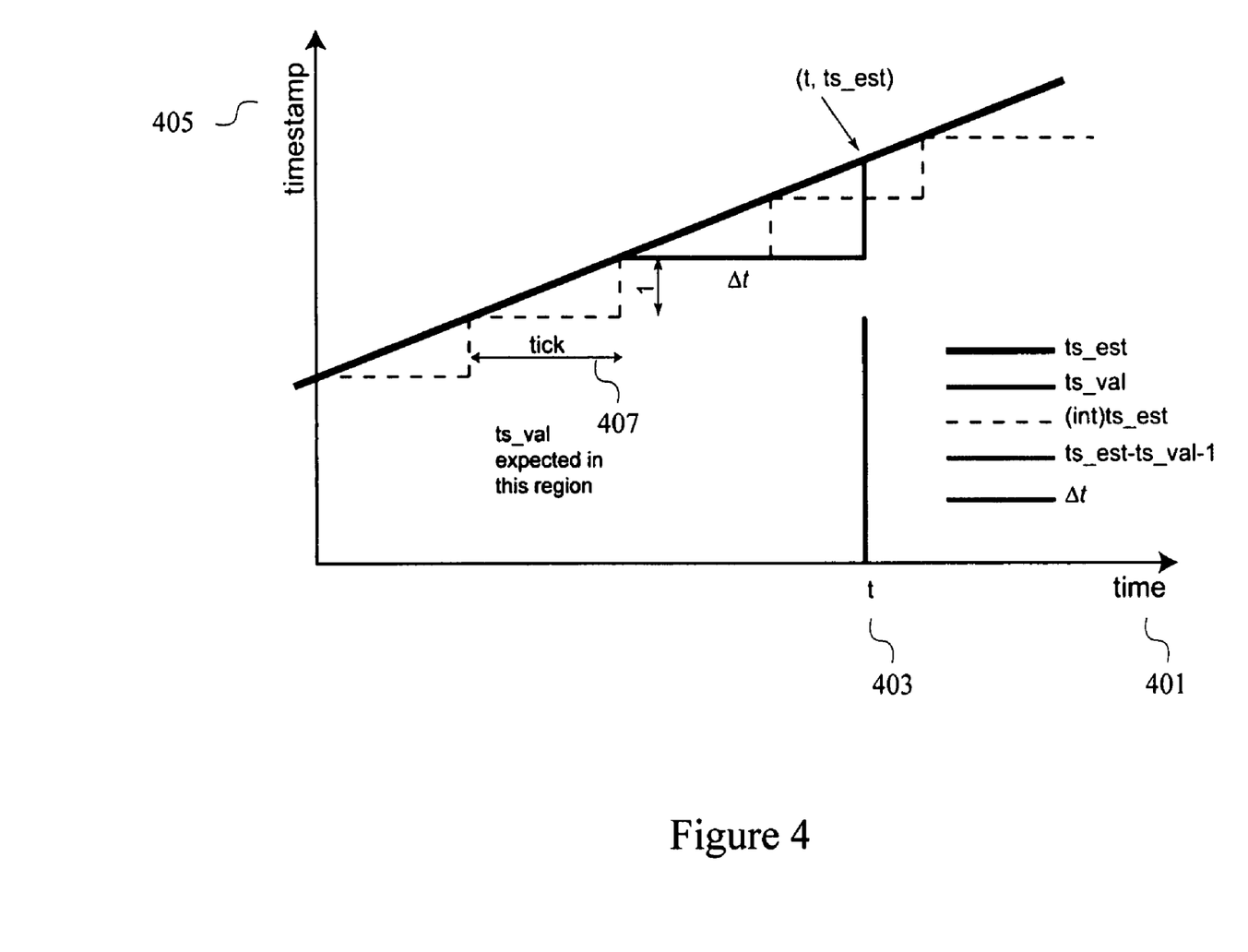
FIG. 4 is a graphical representation showing an incoming timestamp smaller than an expected timestamp due to network delay.

FIG. 4 is a diagrammatic representation showing timestamp estimates graphed with timestamp values showing delay. The x-axis shows time 401 while the y-axis shows timestamps 405. After a period of one tick 407, it is expected that a timestamp will be received from the destination node. Timestamps may arrive readily and steadily at periodic intervals. One particular time stamp arrives at time 403. The timestamp estimate at time 403 is less than the timestamp value received. In this example, the timestamp expected is the timestamp value after three ticks. The timestamp value received is the timestamp value after one tick. Delay in the amount of $\Delta t$ is evident. That is, the ts_val is smaller than the ts_est. If the incoming timestamp is smaller than the predicted timestamp, it is interpreted as evidence of reverse delay. The delay sample can be computed graphically. However, the delay is merely one sample of possible delay.

It should be noted that assuming random packet departure times, even in case of constant reverse delay the sample values will not be constant:

$$\left[\frac{\text{reverse\_delay}}{\text{tick}}\right] \cdot \text{tick} \leq \Delta t \leq \text{reverse\_delay} \quad \text{(Equation 4)}$$

where tick is the clock tick period;
Δt is the reverse delay sample; and
reverse_delay is the actual reverse delay;

To obtain an accurate reverse delay estimation, the maximum Δt is computed over time on the order of several timestamp ticks. According to various embodiments, the max is computed over the last round trip time, and is then fed to a first order filter to obtain the average reverse delay. In order to reduce the number of divisions performed, an optimization is possible by calculating using the following equations:

$$\Delta tstamp \leftarrow \text{ts\_est} - \text{ts\_val} - 1 \quad \text{(Equation 5)}$$

$$\max \Delta t \leftarrow \frac{\max \Delta tstamp}{\text{ts\_speed}} \quad \text{(Equation 6)}$$

$$\text{avg\_rev\_delay} \leftarrow \frac{\text{avg\_rev\_delay} \cdot (N-1) + \max \Delta t}{N} \quad \text{(Equation 7)}$$

where ts_est is the predicted timestamp;
avg_rev_delay is the average reverse delay;
max Δt is the maximum delay;
max Δt stamp is the maximum time stamp;
ts_val is the timestamp value; and
ts_speed is the timestamp speed.

Figure 5:
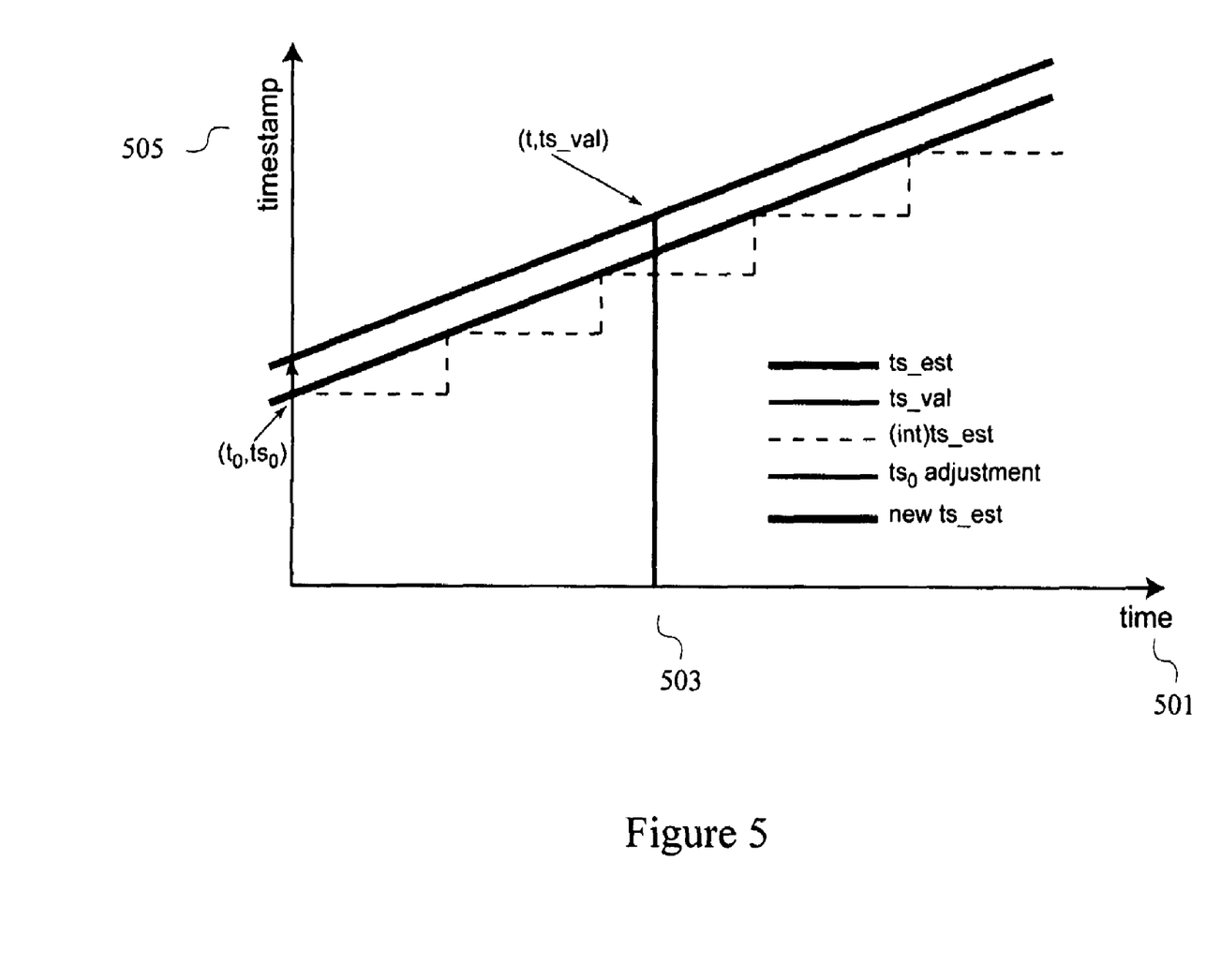
FIG. 5 is a graphical representation showing adjustment of an initial timestamp value.

The maximum is scaled only once per RTT, before feeding it to the averaging filter. The estimated delay is actually the total reverse delay minus the constant (ignoring routing changes) propagation delay. If ts_val, the incoming timestamp, is bigger than the estimated timestamp, then some extra reverse delay was present at the time of the first recorded timestamp, and only now the delay was reduced enough to notice the timestamp discrepancy. In this case the initial timestamp is adjusted, so that future timestamp predictions will be correct. The initial timestamp can be adjusted using the following equation:

$$ts_0 \leftarrow ts\_val - ts\_speed(t - t_0)$$

or $$ts_0 \leftarrow ts\_val - ts\_est \quad \text{(Equation 8)}$$

where ts_speed is the timestamp speed;
$ts_0$ is the initial timestamp;
ts_val is the received timestamp value; and
ts_est is the predicted timestamp;

FIG. 5 is a diagrammatic representation showing initial timestamp estimates and newly determined timestamp estimates. The x-axis shows time 501 while the y-axis shows timestamps 505. At a particular time 503, an actual ts_val is determined. The ts_est subtracted from the ts_val is used to determine a new initial timestamp or $ts_0$.

It is recognized that one of the difficulties in estimating forward and reverse delays is that ts_speed may not be calculated precisely. The variable ts_speed is estimated by observing the remote timestamp ts_val. According to various embodiments, it is important that the estimated ts_speed be smaller than the actual speed, or the Δt value obtained through Equation 3 will be monotonically increasing even in absence of any reverse delay.

Figure 6:
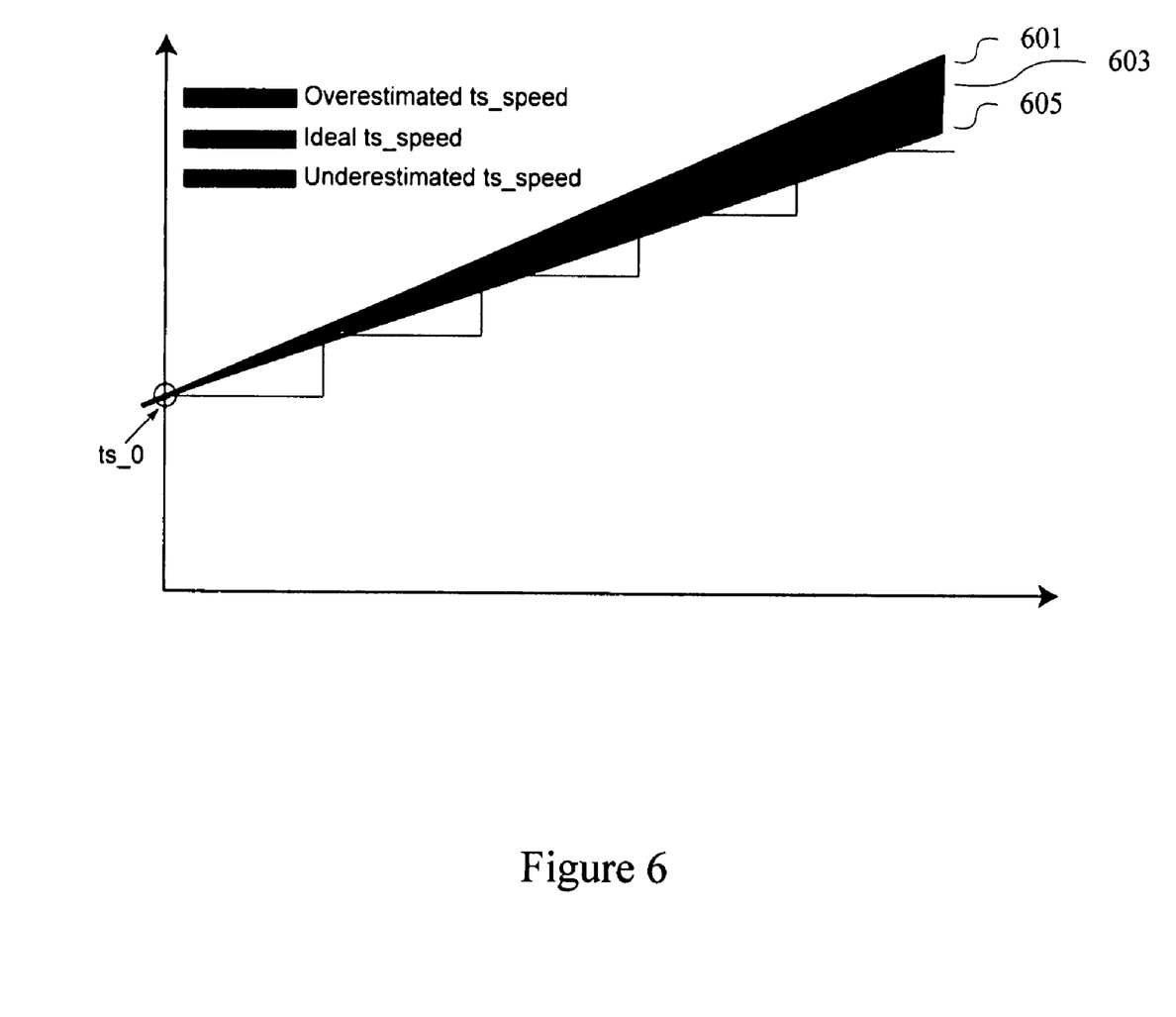
FIG. 6 is a graphical representation showing an uncertainty cone associated with inaccurate timestamp speed determinations.

FIG. 6 shows a timestamp speed uncertainty cone associated with inaccuracies in estimating ts_speed. Overestimating ts_speed is shown at 601. Underestimating ts_speed is shown at 605. An ideal measurement of ts_speed is shown at 603. It is recognized that a constantly increasing Δt value is undesirable. According to various embodiments, the techniques of the present invention recognize that it is beneficial to underestimate the ts_speed value. In some embodiments, the ts_speed value is adjusted using a timestamp speed reduction factor. In some embodiments, the amount of uncertainty is assumed to be less than 50 ppm, so it is sufficient to use a timestamp speed reduction factor of a fraction of the estimated ts_speed bigger than $50/10^6$ to avoid the risk of overestimation.

$$\text{ts\_speed} \leftarrow \text{ts\_speed}(1 - \eta) \quad \eta > \frac{50}{10^6} \quad \text{(Equation 8)}$$

where ts_speed is the timestamp speed; and
η is the timestamp speed reduction factor.

This effectively bends downwards, below the ideal line, the ts_speed uncertainty cone. According to various embodiments, the timestamp speed reduction factor is chosen to be only slightly bigger than the constraint in Equation 8, in order to be able to actually measure the reverse delay. Using an excessive correction factor would result in the estimated timestamp mostly likely being smaller than the received timestamp and cause underestimation errors. The reverse delay is unlikely to be constant in actual networks. During periods of low reverse delay, the incoming timestamp can be larger than the predicted one. Application of Equation 8 realigns the variables, so that on the next period a higher reverse delay is properly detected. In case of long lasting connections it is possible to estimate ts_speed with a precision that is better than the assumed 50 ppm. In this case it is possible to adjust the timestamp speed reduction factor accordingly. At the cost of additional calculations, it is possible to perform multiple estimates with different timestamp reduction factors concurrently and choose the smallest reduction factor for which no long term increase in the reverse delay is evident.

According to various embodiments, if the initial estimate of ts_speed is 100 ticks/s, for example, observing timestamps for more than 200 s results in a precision better than 50 ppm. In some implementations, the initial estimate is adjusted by observing the timestamp increase over periods of 10 minutes and averaging the corresponding samples.

The techniques of the present invention can be implemented on a variety of devices such as hosts and switches. In some examples, the reverse path delay estimation techniques can be implemented at any source originating traffic or destination receiving traffic. In other examples, the techniques of the present invention can also be implemented at tunneling switches used to transmit storage application data over IP networks.

Figure 7:
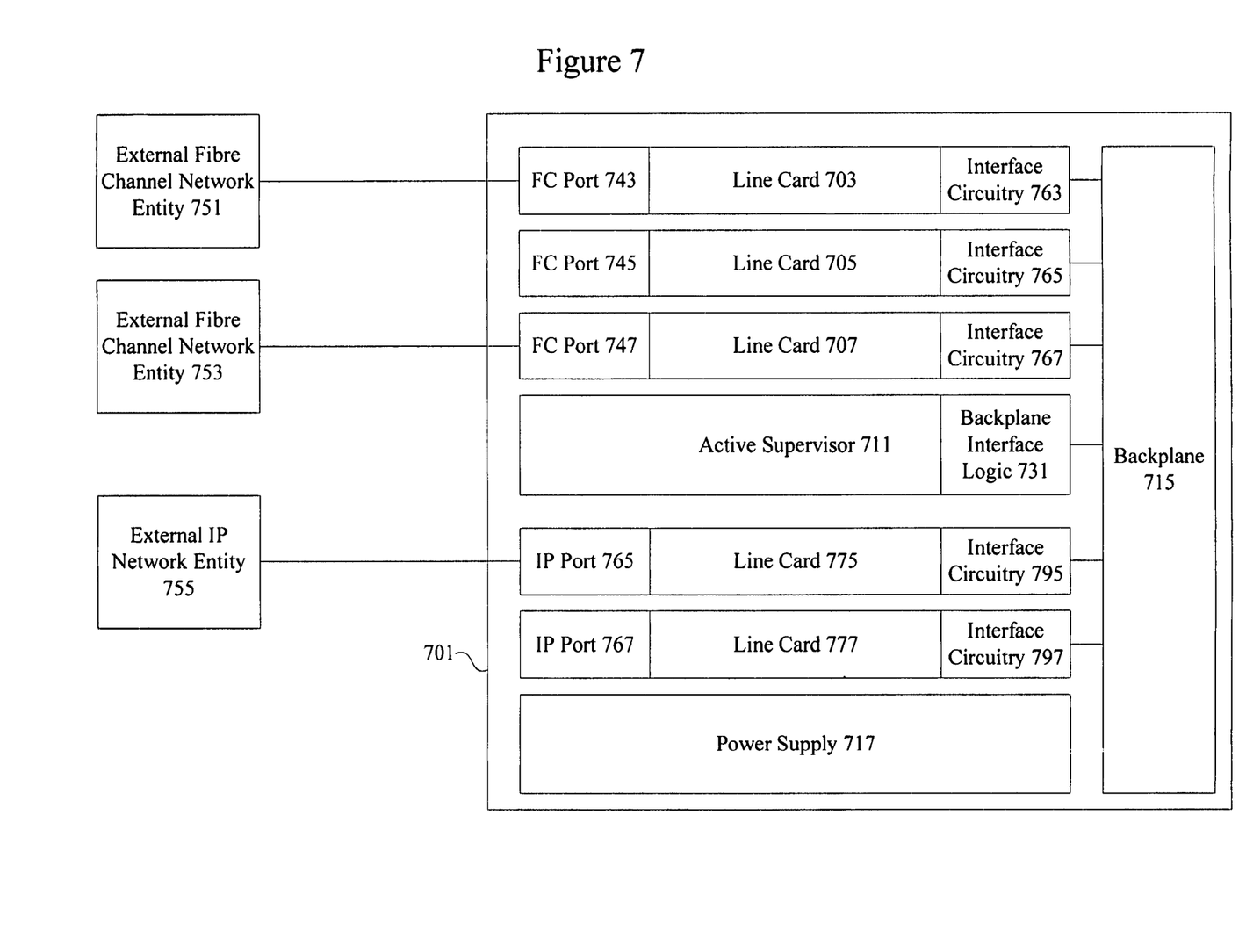
FIG. 7 is a diagrammatic representation showing a fibre channel switch.

FIG. 7 is a diagrammatic representation of one example of a fibre channel switch that can be used to implement techniques of the present invention. Although one particular configuration will be described, it should be noted that a wide variety of switch and router configurations are available. The tunneling switch 701 may include one or more supervisors 711. According to various embodiments, the supervisor 711 has its own processor, memory, and storage resources.

Line cards 703, 705, and 707 can communicate with an active supervisor 711 through interface circuitry 783, 785, and 787 and the backplane 715. According to various embodiments, each line card includes a plurality of ports that can act as either input ports or output ports for communication with external fibre channel network entities 751 and 753. The backplane 715 can provide a communications channel for all traffic between line cards and supervisors. Individual line cards 703 and 707 can also be coupled to external fibre channel network entities 751 and 753 through fibre channel ports 743 and 747.

External fibre channel network entities 751 and 753 can be nodes such as other fibre channel switches, disks, RAIDS, tape libraries, or servers. It should be noted that the switch can support any number of line cards and supervisors. In the embodiment shown, only a single supervisor is connected to the backplane 715 and the single supervisor communicates with many different line cards. The active supervisor 711 may be configured or designed to run a plurality of applications such as routing, domain manager, system manager, and utility applications.

According to one embodiment, a routing application is configured to populate hardware forwarding tables used to direct frames towards their intended destination by choosing the appropriate output port and next hop. A utility application can be configured to track the number of buffers and the number of credits used. A domain manager application can be used to assign domains in the fibre channel storage area network. Various supervisor applications may also be configured to provide functionality such as flow control, credit management, and quality of service (QoS) functionality for various fibre channel protocol layers.

According to various embodiments, the switch also includes line cards 775 and 777 with IP interfaces 765 and 767. In one example, the IP port 765 is coupled to an external IP network entity 755. The line cards 775 and 777 can also be coupled to the backplane 715 through interface circuitry 795 and 797.

According to various embodiments, the switch can have a single IP port and a single fibre channel port. In one embodiment, two fibre channel switches used to form an FCIP tunnel each have one fibre channel line card and one IP line card. Each fibre channel line card connects to an external fibre channel network entity and each IP line card connects to a shared IP network.

In addition, although an exemplary switch is described, the above-described embodiments may be implemented in a variety of network devices (e.g., servers) as well as in a variety of mediums. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

What is claimed is:

1. A method comprising:
    sending a plurality of packets from a source to a destination, wherein the source is a source network node and the destination is a destination network node;
    receiving a plurality of acknowledgments from the destination, wherein the plurality of acknowledgments include a plurality of timestamps provided by the destination;
    identifying a plurality of expected timestamps and a timestamp speed associated with the destination;
    comparing the plurality of expected timestamps to the plurality of timestamps provided by the destination and the timestamp speed associated with the destination to determine reverse path delay, wherein reverse path delay is used to change a destination window size associated with a destination transmission rate;
    wherein an estimate of reverse path delay is calculated using the following formula:

$$\Delta t \leftarrow \frac{ts\_est - ts\_val - 1}{ts\_speed}$$

where ts_est is the expected timestamp, ts_val is the timestamp at time t provided by the destination, and ts_speed is the timestamp speed associated with the destination, the timestamp speed calculated by using ts_val, t, $ts_0$, and $t_0$, where $ts_0$ is the timestamp at time $t_0$ provided by the destination.

2. The method of claim 1, wherein the source observes initial ones of the plurality of timestamps included in the plurality of acknowledgments in order to determine the timestamp speed associated with the destination.

3. The method of claim 2, wherein the timestamp speed is the speed at which the destination updates its timestamp.

4. The method of claim 3, wherein the timestamp speed is one unit every 10 ms.

5. The method of claim 3, wherein the timestamp speed is one unit every 1 ms.

6. The method of claim 2, wherein the timestamp speed is determined using the following equation:

$$ts\_speed \leftarrow \frac{ts\_val - ts_0}{t - t_0}$$

where ts_val is a timestamp received at time t and $ts_0$ is a timestamp received at time $t_0$.

7. The method of claim 1, wherein one of the plurality of expected timestamps is determined using the following equation:

$$ts\_est \leftarrow ts_0 + ts\_speed\,(t - t_0)$$

where ts_est is the estimated timestamp, $ts_0$ is (initially) a timestamp observed at time $t_0$, and t is the current time.

8. The method of claim 1, wherein if an integer part of one of the plurality of expected timestamps is the same as an integer part of one of the plurality of corresponding timestamps provided by the destination, no reverse path delay is noted.

9. The method of claim 1, wherein if an integer part of one of the plurality of timestamps provided by the destination is smaller than the integer of one of the plurality of corresponding expected timestamps, reverse path delay is noted.

10. The method of claim 1, wherein reverse path delay is calculated by computing the maximum Δt over multiple timestamp ticks.

11. The method of claim 1, wherein the maximum Δt is computed over the last round trip time, and is then fed to a first order filter to obtain the reverse delay.

12. The method of claim 1, wherein the timestamp speed is adjusted using a timestamp speed reduction factor.

13. The method of claim 12, wherein the timestamp speed is adjusted using the following equation:

$$\text{ts\_speed} \leftarrow \text{ts\_speed}(1-\eta) \quad \eta > \frac{50}{10^6}$$

where ts_speed is the timestamp speed; and
η is the timestamp speed reduction factor.

14. A system comprising:
a source network device interface configured to send a plurality of packets from a source to a destination and receive a plurality of acknowledgments from the destination, wherein the plurality of acknowledgments include a plurality of timestamps provided by the destination;
a source network device processor configured to identify a plurality of expected timestamps and a timestamp speed associated with the destination and compare the plurality of expected timestamps to the plurality of timestamps provided by the destination and the timestamp speed associated with the destination to determine reverse path delay, wherein reverse path delay is used to change a destination window size associated with a destination transmission rate;
wherein an estimate of reverse path delay is calculated using the following formula:

$$\Delta t \leftarrow \frac{\text{ts\_est} - \text{ts\_val} - 1}{\text{ts\_speed}}$$

where ts_est is the expected timestamp, ts_val is the timestamp at time t provided by the destination, and ts_speed is the timestamp speed associated with the destination, the timestamp speed calculated by using ts val, t, $ts_0$, and $t_0$, where $ts_0$ is the timestamp at time $t_0$ provided by the destination.

15. The system of claim 14, wherein the source observes initial ones of the plurality of timestamps included in the plurality of acknowledgments in order to determine the timestamp speed associated with the destination.

16. The system of claim 15, wherein the timestamp speed is the speed at which the destination updates its timestamp.

17. The system of claim 15, wherein the timestamp speed is determined using the following equation:

$$\text{ts\_speed} \leftarrow \frac{\text{ts\_val} - ts_0}{t - t_0}$$

where $ts_{13}$ val is a timestamp received at time t and $ts_0$ is a timestamp received at time $t_0$.

18. The system of claim 14, wherein one of the plurality of expected timestamps is determined using the following equation:

$$\text{ts\_est} \leftarrow ts_0 + \text{ts\_speed}(t-t_0)$$

where ts_est is the estimated timestamp, $ts_0$ is (initially) a timestamp observed at time $t_0$, and t is the current time.

19. The system of claim 14, wherein if an integer part of one of the plurality of expected timestamps is the same as an integer part of one of the plurality of corresponding timestamps provided by the destination, no reverse path delay is noted.

20. The system of claim 14, wherein if an integer part of one of the plurality of timestamps provided by the destination is smaller than the integer of one of the plurality of corresponding expected timestamps, reverse path delay is noted.

21. The system of claim 14, wherein reverse path delay is calculated by computing the maximum Δt over multiple timestamp ticks.

22. The system of claim 14, wherein the maximum Δt is computed over the last round trip time, and is then fed to a first order filter to obtain the reverse delay.

23. The system of claim 14, wherein the timestamp speed is adjusted using a timestamp speed reduction factor.

24. The system of claim 23, wherein the timestamp speed is adjusted using the following equation:

$$\text{ts\_speed} \leftarrow \text{ts\_speed}\,(1-\eta\,)\eta > \frac{50}{10^6}$$

where ts_speed is the timestamp speed; and
η is the timestamp speed reduction factor.

25. A network node comprising:
means for sending a plurality of packets from a source to a destination, wherein the source is a source network node and the destination is a destination network node;
means for receiving a plurality of acknowledgments from the destination, wherein the plurality of acknowledgments include a plurality of timestamps provided by the destination;
means for identifying a plurality of expected timestamps and a timestamp speed associated with the destination;
means for comparing the plurality of expected timestamps to the plurality of timestamps provided by the destination and the timestamp speed associated with the destination to determine reverse path delay, wherein reverse path delay is used to change a destination window size associated with a destination transmission rate;
wherein an estimate of reverse path delay is calculated using the following formula:

$$\Delta t \leftarrow \frac{\text{ts\_est} - \text{ts\_val} - 1}{\text{ts\_speed}}$$

where ts_est is the expected timestamp, ts_val is the timestamp at time t provided by the destination and ts_speed is the timestamp speed associated with the destination, the timestamp speed calculated by using ts val, t, $ts_0$, and $t_0$, where $ts_0$ is the timestamp at time $t_0$ provided by the destination.

* * * * *

UNITED STATES PATENT AND TRADEMARK OFFICE
CERTIFICATE OF CORRECTION

PATENT NO. : 7,643,430 B2  
APPLICATION NO. : 11/291251  
DATED : January 5, 2010  
INVENTOR(S) : Guglielmo M. Morandin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1012 days.

Signed and Sealed this

Fourth Day of January, 2011

David J. Kappos  
*Director of the United States Patent and Trademark Office*